YOSHISADA HAYAMIZU
SATORU SAKAMOTO,
INVENTORS

United States Patent Office 3,547,514
Patented Dec. 15, 1970

3,547,514
ELONGATED VARIABLE MAGNIFICATION OPTICAL SYSTEM
Yoshisada Hayamizu and Satoru Sakamoto, Tokyo, Japan, assignors to Olympus Optical Co., Inc., Tokyo, Japan
Filed Nov. 20, 1967, Ser. No. 684,299
Claims priority, application Japan, Dec. 30, 1966, 41/85,932, 41/85,933
Int. Cl. G02b 15/06
U.S. Cl. 350—39
5 Claims

ABSTRACT OF THE DISCLOSURE

An elongated variable magnification optical system comprising an elongated image transmitting optical system, an objective lens in front of the front end surface of said image transmitting optical system, a prism in front of said objective lens for deflecting the light incident thereto from an object located at an angle from the optical axis of the optical system into coincidence with the optical axis, a plurality of lenses arranged around said prism, said prism and said plurality of lenses being permitted to be rotated relative to each other so that the selected one of said plurality of the lenses is brought into a position in alignment with the path of the light incident to the prism thereby permitting the magnification to be varied as desired.

BACKGROUND OF THE INVENTION

The present invention relates to an elongated variable magnification optical system, and more particularly to an elongated variable magnification image transmitting optical system in which the magnitude of the image formed by the objective lens can be varied without requiring any complicated construction of the optical system with the volume necessary for construction of the optical system kept to the minimum.

It is well-known in the field of elongated image transmitting optical systems such as fiber optical systems to locate an objective lens in front of the front end surface of the fiber optical system so as to focus the image of an object on said front end surface of the fiber optical system so that the image is transmitted from the front end surface to the rear end surface of the fiber optical system through said fiber optical system.

Also, it is well-known in the field of elongated image transmitting optical systems to locate a prism at a position in front of the objective lens which is located in front of the front end surface of the elongated image transmitting optical system thereby deflecting the path of the light incident to the prism from the object into coincidence with the optical axis of the optical system so as to observe the object positioned at an angle from the longitudinal optical axis of the elongated image transmitting optical system. Generally, such an elongated optical system is required to be assembled as compactly as possible, therefore, it is very difficult to construct the optical system as a variable magnification optical system in which objective lenses having different focal lengths can be selectively positioned in the optical system for variation of the magnitude of the resultant image.

As to one method for resolving the above difficulties, the applicant has already proposed an elongated variable magnification optical system as disclosed in the co-pending application Ser. No. 634,931 filed on May 1, 1967, now abandoned in which an objective lens is located in front of an image transmitting optical system, which objective lens is adapted to focus the image of an object on the front end surface of said image transmitting optical system, an aperture diaphragm being located at a position adjacent to the front focal point of said objective lens, a selectively interchangeable lens system being added in front of said aperture diaphragm thereby permitting variation in the magnification of the entire optical system by interchanging said interchangeable lens system. In said optical system, an additional lens system may be located at a position in front of said aperture diaphragm adjacent thereto in such a manner that the rear principal plane of said additional lens system is positioned adjacent to the front focal point of said objective lens thereby permitting shifting of the position of the image forming plane resulting from the variation in the magnification of the optical system by changing said selectively interchangeable lens system within an appropriate range.

SUMMARY OF THE INVENTION

The present invention is a further development of the above described optical system in which an objective lens is located in front of the front end surface of an elongated image transmitting optical system, a prism being located in front of said objective lens for deflecting the light incident thereto at an angle to the optical axis of the optical system into coincidence with the optical axis, a plurality of objective lenses having different powers being arranged surrounding said prism in annular form so that the light incident to said prism may be selectively passed through one of said plurality of the lenses, thereby permitting the desired variation in the magnification of the entire optical system to be obtained by rotating the prism about the optical axis of the elongated image transmittting optical system so that the above-mentioned difficulties are avoided while in maintaining the length of the optical system at the minimum.

The present invention includes another development of the above-mentioned optical system in which a rotatable lens holding ring carrying a plurality of objective lenses having different powers located circumferentially thereof in spaced relationship from each other are located around a fixedly secured prism positioned in front of an objective lens which in turn is located in front of the front end surface of the elongated image transmitting optical system so as to focus the image of an object located at an angle to the optical axis of the optical system on the front end surface of the image transmitting optical system through said prism, the light from the object being passed through the selected one of said plurality of the lenses mounted in said lens holding ring by suitably rotating the ring about the optical axis of the optical system so as to direct the light to said prism so that the light incident to the prism is deflected to coincide with the optical axis of the optical system, thereby permitting the desired variation in the magnification of the entire optical system to be obtained.

An object of the present invention is therefore to provide an elongated variable magnification optical system of the kind as described above which overcomes the difficulties in the prior art optical systems so as to permit the magnification of the optical system to be easily varied without the necessity of providing any complicated construction of the optical system and to be assembled as compactly as possible for advantageous utilization of such an optical system.

According to the present invention an elongated variable magnification optical system is provided which comprises an elongated image transmitting optical system, an objective lens located in front of the front end surface of said image transmitting optical system for focusing the image of an object on the front end surface of the image transmitting optical system, a prism located in front of the objective lens for deflecting the light incident thereto from the object located at an angle to the optical axis of the optical system into coincidence with the optical axis, said optical system being characterized by a plurality of objective lenses having different powers and arranged around the prism in annular form in spaced relationship from each other along the periphery of said annular form, the light from the object being passed through the selected one of said plurality of the lenses before it reaches the prism by rotating either said prism or said plurality of lenses as a unit around the optical axis of the optical system so as to position said selected one of said plurality of the objective lenses in the path of the light incident to said prism thereby permitting the magnification of the entire optical system to be varied in desired manner.

DESCRIPTION OF THE PREFERRED EMBODIMENTS

Figure 1:
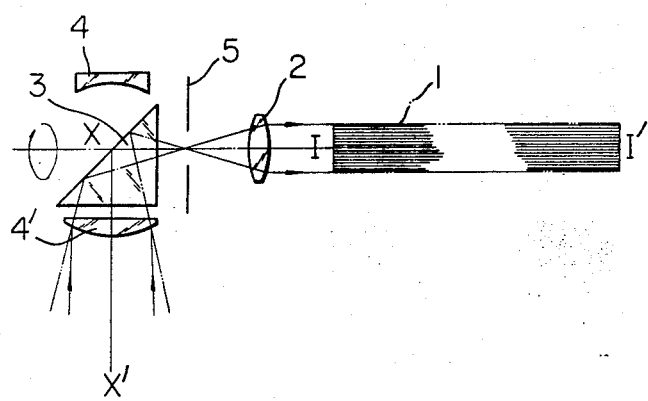
FIG. 1 is a schematic view showing one form of the image forming and magnification varying system in the elongated image transmitting optical system according to the present invention.

Referring to FIG. 1, a first embodiment of the present invention comprises an elongated image transmitting optical system 1 such as a fiber optical system having front end surface I and rear end surface I', an objective lens 2 located in front of front end surface I of image transmitting optical system 1 for focusing the image of an object on said front end surface I, the image formed on front end surface I being transmitted to rear end surface I' through image transmitting optical system 1, a prism 3 located in front of said objective lens 2 for deflecting the light (X') incident thereto from the object located at an angle to the optical axis X of the optical system into coincidence with the optical axis X, and preferably a diaphragm aperture 5 interposed between said prism 3 and said objective lens 2. Diaphragm aperture 5 may be eliminated, but it is preferable to provide diaphragm aperture 5 at a position adjacent to the front focal point of objective lens 2 so that the principal light rays leaving objective lens 2 toward front end surface I are made substantially parallel in order to improve the performance of the optical system.

In accordance with the present invention, a plurality of convex and/or concave lenses having different powers, 4, 4' . . . are provided around prism 3 in annular form in spaced relationship from each other along the circumference of said prism 3. The light incident to prism 3 from the object is adapted to pass through the selected one of said plurality of lenses 4, 4' . . . . Prism 3 is so arranged that it is rotatable about the optical axis X of the optical system. Therefore, any one of said plurality of the lenses 4, 4' can be brought into alignment with the path of the light incident to prism 3 by rotating prism 3 about the optical axis X, whereby desired variation in magnification of the entire optical system can be obtained.

Figure 2:
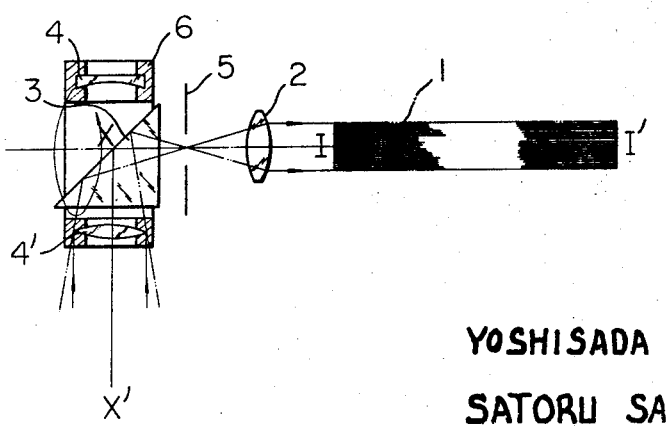
FIG. 2 is a schematic view showing another form of the image forming and magnification varying system according to the present invention.

A second embodiment of the present invention shown in FIG. 2 is very similar to that shown in FIG. 1 except that said plurality of lenses 4, 4' . . . are mounted in a lens holding ring 6 rotatably mounted in the optical system around fixedly secured prism 3 so as to be rotated about the optical axis X so that the selected one of said plurality of the lenses 4, 4' . . . is brought into alignment with the path of the light incident to the fixedly secured prism 3 thereby permitting the magnification of the entire optical system to be varied in desired manner.

In the foregoing description, each of objective lens 2, a plurality of lenses 4, 4' . . . is shown as being a single lens, but it is evident that the lenses may be replaced by composite lens systems suitably designed to meet the purpose.

Since the present invention is constructed as described above, the entire volume necessary for construction of the variable magnification optical system of the present invention can be kept to the minimum thereby providing significant effectiveness in utilization of the optical system.

The present invention is not intended to be limited to the preferred embodiments as shown and described hereinabove, but it is intended to include all the modifications and changes falling within the spirit and the scope of the present invention as defined in the appended claims.

We claim:

1. An elongated variable magification optical system comprising an elongated image transmitting fiber optical system having a front end surface on which the image of an object is to be focused and a rear end surface to which said image is transmitted through said elongated image transmitting fiber optical system, an objective lens located in front of the front end surface of the elongated image transmitting fiber optical system for focusing the image of the object on the front end surface of the elongated image transmitting fiber optical system, a substantially right angle reflecting prism located in front of the objective lens for reflecting the light incident thereon from the object which is located at an angle to the optical axis of the elongated image transmitting fiber optical system so that the light reflected by the prism coincides with said optical axis, a lens holding ring closely encircling said prism, a plurality of lenses having different powers mounted in said lens holding ring around the prism in an annular arrangement in spaced relationship with each other along the circumference of said lens holding ring, one of said prism and said lens holding ring being relatively rotatable with respect to the other about said optical axis, a diaphragm aperture located in front of the objective lens at a position substantially coinciding with the front focal point of said objective lens so that the principal light rays leaving the objective lens toward the front end surface of the image transmitting fiber optical system are substantially perpendicular to the said front end surface of the said system, whereby a selected one of said plurality of lenses is moved into alignment with the path of the light incident to said prism from the object when the prism or the lens holding ring is rotated about the optical axis of the optical system, thereby permitting the magnification of the entire optical system to be varied.

2. An optical system as claimed in claim 1 in which the prism is rotatable and the lens holding ring is fixed.

3. An optical system as claimed in claim 1 in which the lens holding ring is rotatable and the prism is fixed.

4. An elongated variable magnification optical system as claimed in claim 1 wherein the objective lens and the plurality of the lenses are single lenses.

5. An elongated variable magnification optical system as claimed in claim 1 wherein the objective lens and the plurality of the lenses are composite lens systems.

References Cited

UNITED STATES PATENTS

| | | | |
|---|---|---|---|
| 1,094,724 | 4/1914 | Konig | 350—183 |
| 1,097,635 | 5/1914 | Humbrecht | 350—39 |
| 2,552,940 | 5/1951 | Cornut | 350—39 |
| 3,207,034 | 9/1965 | Harter | 350—96V |
| 3,016,785 | 1/1962 | Kapany | 350—7 |
| 2,651,969 | 9/1953 | Thor | 350—18X |

DAVID H. HUBIN, Primary Examiner

U.S. Cl. X.R.:

350—96, 183, 207, 254